July 31, 1934. D. A. ROGERS 1,968,655
PROCESS FOR THE PURIFICATION OF GASES
Filed June 13, 1931
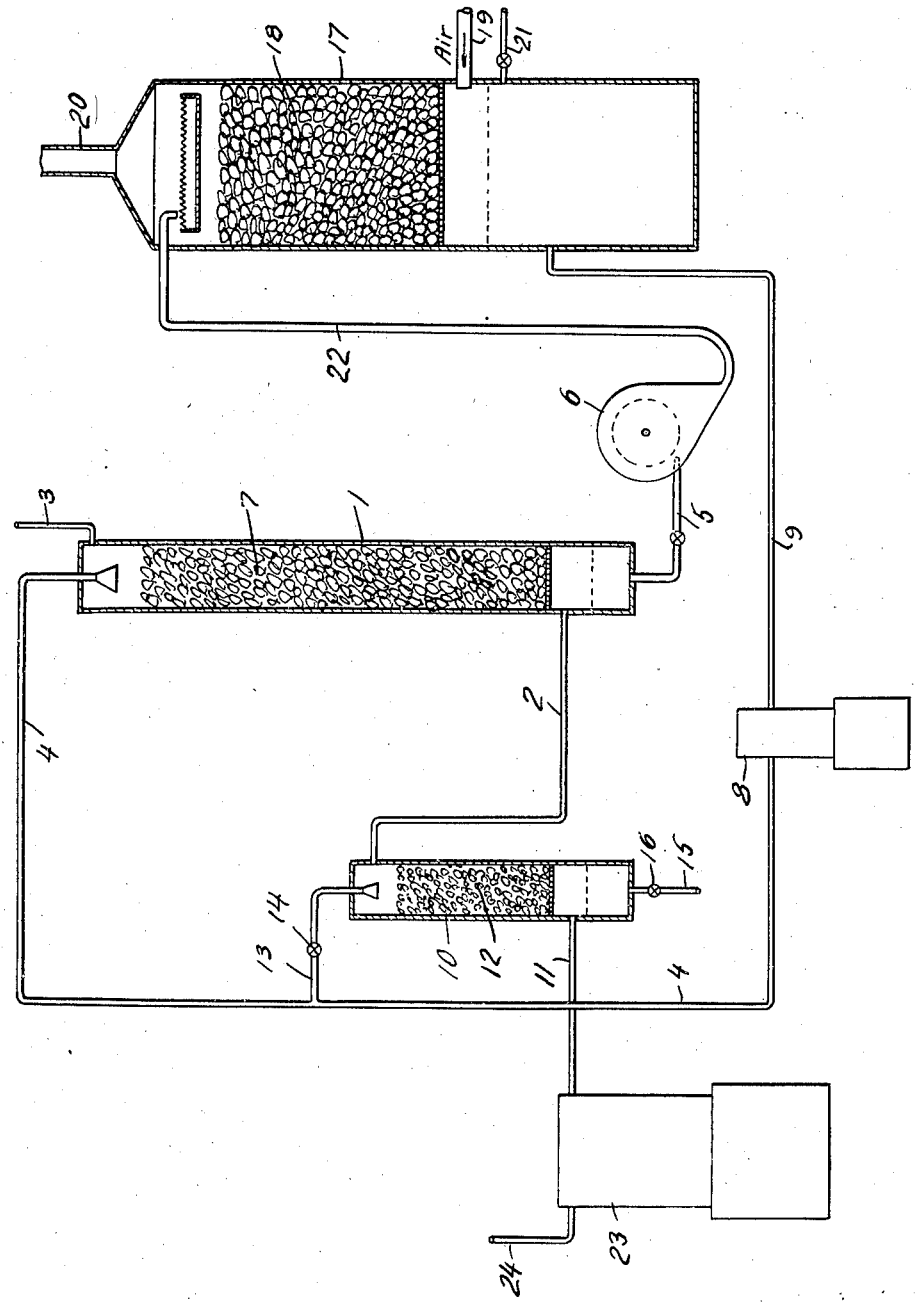
INVENTOR
Donald A. Rogers
BY
ATTORNEY Patented July 31, 1934

1,968,655

UNITED STATES PATENT OFFICE 1,968,655

PROCESS FOR THE PURIFICATION OF GASES

Donald A. Rogers, Petersburg, Va., assignor to Atmospheric Nitrogen Corporation, New York, N. Y., a corporation of New York Application June 13, 1931, Serial No. 544,181

4 Claims. (Cl. 183—115)

This invention relates to a process for the purification of gases. More particularly this invention relates to a process for removing a constituent from a mixture of gases by absorbing it in a liquid.

Numerous processes are known for the purification of gases by absorption of a constituent of the gas in an absorption liquid. For example, it is well known that carbon dioxide contained in a gaseous mixture may be absorbed in water by scrubbing the gas under pressure with water. Methods for removing carbon dioxide are of particular importance in processes such as the synthetic ammonia process wherein a crude gas containing nitrogen, hydrogen, carbon dioxide and other impurities, is purified by removal of constituents other than the hydrogen and nitrogen and the purified gas is passed under relatively high pressures in contact with an ammonia synthesis catalyst.

As heretofore carried out, the removal of carbon dioxide from the crude gases intended for ammonia synthesis has been accomplished by compressing the gases and scrubbing them at an elevated pressure with water introduced into a scrubbing tower through which the gases are passed. The water containing absorbed carbon dioxide is treated to recover energy from the liquid under pressure containing absorbed carbon dioxide which is evolved upon reduction of the pressure upon the liquid, and the spent liquid rejected.

This use of water for a single scrubbing of the gas requires a large and continuous supply of water which is at times not available or may be available only at an excessive cost. It has, therefore, been proposed to re-use the spent pressure water containing dissolved carbon dioxide by letting down the pressure to evolve carbon dioxide therefrom and re-utilizing the regenerated water for purification of additional quantities of gas. It has likewise been proposed to purify gas mixtures of carbon dioxide or other constituents employing absorption liquids other than water, as for example soda solutions, in which case economic operation usually requires that the solution containing the absorbed constituent be regenerated for use in purifying additional quantities of the gas.

It is an object of this invention to provide a continuously operable process for the purification of gases by absorption of a constituent of the gas in a liquid which is then regenerated and used for the treatment of additional quantities of the gas. In particular, it is an object of this invention to provide an efficient process for removing carbon dioxide from gases containing the same by compressing the gas and scrubbing it at an elevated pressure with a liquid such as water in which the carbon dioxide is absorbed and from which it may be again evolved and the liquid regenerated and the regenerated liquor used for the purification of additional quantities of the gas.

When, as is usually the case, the gas to be purified comes directly from a compressor, it contains heat of compression, and the water or other liquid scrubbing medium, therefore, removes the impurities and at the same time is warmed by the absorption of heat from the gas. This elevated temperature of the gas, whether it be due to the compression or to other causes, tends to reduce the effectiveness of a purification system wherein the absorption liquid is recirculated, by causing the recirculating liquid to become heated, thereby lowering its effectiveness in purifying the gas. Accordingly, it is a further object of this invention to provide a process for the purification of a gas at an elevated temperature employing a system wherein absorption liquid recirculates in contact with the gas at a temperature below that of the gas entering the purification system. Other objects of the invention will in part be obvious and will in part appear hereinafter.

I have found that in purifying a gas by absorbing a constituent thereof in an absorption liquid which is recirculated in a system wherein it is regenerated and re-used for the treatment of additional quantities of the gas, that the overall efficiency of the purification system in terms of degree of purification and volume of water circulated per volume of gas treated, may be improved if the gas is treated in stages in the sense that in the first stage the gas coming from the compressor and containing heat of compression is treated with a relatively small portion of the water, for example not more than about 5%, in amount sufficient to cool the gas to substantially ordinary temperature, i. e., the temperature for $CO_2$ removal. This stage is not cyclic with respect to the water. In the subsequent or second stage the gas is treated in a cyclic or recirculatory system with the main portion of water.

Preferably the water for the first stage is a portion of the regenerated recirculating water of the second stage, fresh water in corresponding amount being introduced into the second or cyclic stage to compensate for the amount thus withdrawn from circulation. The water recirculating in the second stage may absorb incidental impurities from the gas which are not eliminated by the regeneration treatment. By employing a portion of this recirculating water for the treatment of the gas in the first stage and replacing this portion with fresh water, the system operates at a high efficiency in terms of degree of purification and of volume of water circulated per volume of gas treated and provision is likewise made for removing these incidental impurities from the system.

The process, therefore, comprises a first non-cyclic stage which is primarily for cooling the gas and a second cyclic stage which is primarily for the purification of the gas. Since the amount of water passing through the first stage is relatively small in comparison with the amount passed through the second stage, the operation remains predominately cyclic and the economies which flow from the cyclic operation are not only retained but augmented.

In operating in accordance with the process of this invention, the water employed primarily for the cooling of the gas in the first stage is discharged from that stage at a relatively high temperature and with correspondingly less carbon dioxide per unit volume of water absorbed therein than would be the case if this water remained with that recirculating for treatment of the gas in the second stage. I have found, however, that for equal quantities of crude gas to be purified and for equal volumes of, for example carbon dioxide to be removed from the gas, the use of two stages for the purification treatment results in marked economies in operation. In absorbing carbon dioxide from a gas, for example, by passing the gas upwardly through a scrubber countercurrent to a descending flow of water, a relatively low temperature at the top of the scrubber results in a low content of carbon dioxide in the gas leaving the scrubber while a low temperature at the bottom of the scrubber serves to lessen the quantity of water necessary for the treatment of a given volume of the gas. If, therefore, the temperature of the incoming water is increased, resulting in an increased temperature at both the top and bottom of the scrubber, the rise in temperature at the top causes an increase in the carbon dioxide content of the gas leaving the scrubber and the rise in temperature at the bottom necessitates the use of additional water to carry the carbon dioxide in solution therein. On the other hand, if the gas enters the scrubber at a relatively high temperature this causes a rise in temperature effective primarily at the bottom of the scrubber. In such a case, while additional water must be pumped, the degree of purification of the gas is not appreciably affected. When the water is recirculated, however, heat absorbed from the gas in the scrubber tends to elevate the temperature of the water in the recirculatory system. This operates to increase the general temperature plane of the recirculating liquid and with a rise in the temperature in the top of the scrubber, an increase in the carbon dioxide content of the purified gas results. When the purifying liquid is used but once for treating the gas, the problem of removing incidental impurities does not arise and the problem of heat removal from the system is relatively unimportant since an elevated temperature of the gas may be compensated for by a minor increase in the amount of liquid without the amount of carbon dioxide left in the gas increasing. On the other hand, when the liquid is recirculated, then both the problems of removing incidental impurities and heat from the purification system assume great importance.

I have found that by treating the gas in two stages, the first of which operates primarily to remove heat from the system at a relatively high temperature, despite the decrease in the amount of carbon dioxide removed per unit volume of water employed in this first stage as compared with the second stage, the operation in two stages causes a diminution of water required in the second stage for purification of the gas greater than the amount of water required in the first stage for cooling the gas, so that the total effect is a high degree of purification of the gas by means of a smaller amount of water circulated in contact therewith than is obtained with but a single scrubbing stage.

For a fuller understanding of the nature and objects of the invention, reference should be had to the following detailed description of a process for the removal of carbon dioxide from a gas mixture intended for ammonia synthesis, taken in connection with the accompanying drawing illustrating an apparatus suitable for carrying out such a process.

Referring to the drawing, the numeral 1 indicates a gas scrubber in which a gas introduced through a pipe 2, passing upwardly through the tower, and leaving through a pipe 3 may be intimately contacted with a liquid introduced into the top of tower 1 through a pipe 4 and passing from the tower through a pipe 5 to a Pelton wheel 6. Tower 1 preferably contains a packing material 7 for bringing the liquid and gas passing countercurrently therethrough into intimate contact with each other. A pump 8 serves to force a liquid drawn from a pipe 9 through pipe 4 into the top of tower 1. The numeral 10 indicates a cooler communicating with a gas inlet pipe 11 and with pipe 2. In the apparatus shown in the drawing, cooler 10 takes the form of a tower containing a packing 12 and provided with a pipe 13 which communicates with pipe 4. Pipe 13 is provided with a valve 14 for controlling the flow of liquid through the pipe. A pipe 15 with valve 16 leads from the bottom of cooler 10 to, for example, a waste water sewer not shown in the drawing. Numeral 17 indicates a desorber tower which preferably contains a packing 18 and is provided with an air inlet pipe 19 and a gas outlet pipe 20. The bottom of desorber tower 17 communicates with pipe 9 and with a pipe 21 for the introduction of fresh makeup liquid into the bottom of the tower. A pipe 22 communicates between Pelton wheel 6 and the interior of the top of desorber 17 and serves for the passage of liquid and gas from the Pelton wheel to tower 17. A single stage compressor or the last stage of a multiple stage gas compressor through which the gas from a pipe 24 passes to be compressed to the pressure desired for the purification treatment is diagrammatically represented at 23. The gas with its heat of compression passes through pipe 11 into the bottom of cooler 10, upwardly through the cooler, through pipe 2 to scrubbing tower 1 and from this scrubbing tower through a pipe 3 to an additional purification treatment or to the place where the gas is to be utilized, as may be desired.

In employing the apparatus shown in the drawing for the purification of a crude ammonia synthesis gas containing carbon dioxide, the gas is compressed to an elevated pressure in the gas compressor and is passed in series through the cooler and the water scrubber. The compression of the gas takes place substantially adiabatically, that is to say, that while the cylinders of the gas compressor may be cooled and there may thus be an incidental cooling of the gas during compression or the gas may be cooled intermediate one or more of the stages of compression, yet as a result of at least the final stage of compression, the gas is raised to an elevated temperature above the temperature at which it is to be treated for removal of carbon dioxide therefrom. An absorption liquid, preferably water, at ordinary atmospheric temperatures is recirculated in a cyclic system which comprises the gas scrubber, the Pelton wheel, the desorber and the water pump. In this cyclic system, the water is injected under pressure into scrubber 1 and in flowing downwardly through the scrubber, passes in intimate contact and in countercurrent flow with the compressed gas passing upwardly through the scrubber. Carbon dioxide is absorbed from the gas and the pressure water containing the absorbed carbon dioxide passes to the Pelton wheel where the pressure is released and carbon dioxide is evolved from the water. The energy thus recoverable in the Pelton wheel may be utilized as, for example, in actuating the water pump 8. The water and gas at a reduced pressure leaving the Pelton wheel through pipe 22, enters the top of the desorber tower where it is aerated by passing in direct contact with air introduced into the desorber. This aeration of the water serves to remove residual carbon dioxide therefrom which was not evolved upon release of the pressure in the Pelton wheel, and with the introduction of fresh water through pipe 21, completes a regeneration of the water, fitting it for re-use in the scrubbing tower, to which it is returned under pressure by pump 8.

A relatively minor proportion of the water thus recirculating through the system comprising scrubber 1 and desorber 17 is diverted from pipe 4 by being passed through pipe 13 into the top of cooler 10. In the cooler the water passes downwardly over the packing therein and in direct contact with the relatively warmer gas from the compressor introduced into the bottom of the cooler through pipe 11, passing upwardly through the cooler, and leaving through pipe 2 on its way to the bottom of scrubber 1. The water thus contacted with the gas in the cooler leaves the bottom of the cooler through pipe 15 and is discharged from the system. The amount of water passed through cooler 10 is regulated by means of valve 14 so as to cool the gas from the compressor to substantially the temperature of the scrubbing water used in scrubber 1. By thus using a relatively small portion of the scrubbing water for cooling the gas, the heat removed from the gas is concentrated in this small portion of the scrubbing water.

It is preferred to cool the gas to substantially the temperature at which the absorbent liquid is introduced into contact therewith since, as noted above, the general temperature plane of the purification liquid is affected by the temperature of the gas entering scrubber 1. It may not be necessary in all cases to cool the gas to a temperature as low as the temperature of the water used for removal of carbon dioxide, since some of the heat absorbed by the scrubbing water from the gas may be dissipated from the water in its circulation through the cyclic system. The degree of cooling of the gas in the cooler, however, should be such that the residual heat absorbed in the recirculating water is insufficient to cause a substantial rise in the temperature plane of the recirculating scrubber water.

The amount of water used for the preliminary cooling of the gas and then discharged from the system as well as other incidental losses of water is replaced by introducing makeup water from pipe 21. This introduction of makeup water and discharge of liquid from the system serves to keep the concentration of incidental impurities in the scrubbing water, which are not liberated by the regeneration treatment for removal of carbon dioxide, from building up in the system and thus serves to maintain the scrubbing liquid at a proper concentration as regards these impurities.

Since certain changes may be made in carrying out the above process without departing from the scope of the invention, it is intended that all matter contained in the above description shall be interpreted as illustrative and not in a limiting sense. While the invention has been particularly described with reference to the purification of a gas from carbon dioxide contained therein using water as an absorbent for the carbon dioxide, the invention is applicable in general to the removal of one or more constituents of a mixture of gases by absorption in a liquid. Furthermore, for the absorption of carbon dioxide, liquids other than water may be employed, as for example, a solution of sodium carbonate or an ammoniacal solution.

I claim:

1. The process of removing carbon dioxide from a gas containing the same which comprises substantially adiabatically compressing said gas, recirculating a liquid carbon dioxide absorbent in a cyclic system and in said system passing the liquid absorbent in contact with said gas containing carbon dioxide at an elevated pressure and at a temperature below the temperature of said compressed gas to absorb carbon dioxide therefrom, regenerating the absorption liquid containing carbon dioxide and returning the regenerated liquid to contact with additional quantities of said compressed gas, and during the conduct of the aforesaid steps, diverting a portion of the liquid circulating in said cyclic system, directly contacting the diverted portion of liquid with said compressed gas to cool it, and discharging said portion of liquid to a point outside said cyclic system.

2. The process of removing carbon dioxide from a gas containing the same which comprises substantially adiabatically compressing said gas, recirculating water in a cyclic system and in said system passing said compressed gas containing carbon dioxide in contact with the water at a temperature below the temperature to which the gas is heated by said adiabatic compression to absorb carbon dioxide from the gas, reducing the pressure upon the water containing absorbed carbon dioxide and aerating said water at the reduced pressure to evolve carbon dioxide therefrom, diverting a portion of the aerated water recirculating in the aforesaid cyclic system, passing the diverted water in direct contact with the aforesaid adiabatically compressed gas in an amount sufficient to cool said gas to substantially the temperature of the water contacted therewith in the said cyclic system, discharging to outside of the cyclic system the water diverted therefrom and contacted with the compressed gas, and introducing fresh makeup water into said cyclic system.

3. The process of removing carbon dioxide from a gas containing the same which comprises compressing said gas, passing the compressed gas in series through a cooling tower and a gas absorption tower, continuously recirculating water in a cyclic system comprising said gas absorption tower and a gas desorber, and in said system intimately contacting in countercurrent flow and under an elevated pressure water circulating therein with the gas passing through the absorption tower to absorb carbon dioxide from the gas, releasing the pressure upon the water containing absorbed carbon dixiode while recovering energy therefrom, aerating the water at a reduced pressure in the gas desorber to liberate carbon dioxide therefrom, introducing the aerated water into the absorption tower, continuously diverting a portion of the recirculating water and passing said portion through the aforesaid cooling tower in direct contact and in countercurrent flow with the gas passing therethrough to cool said gas to a temperature about that of the water entering the absorption tower, discharging the water from the cooling tower to outside of the aforesaid cyclic system, and introducing into the cyclic system fresh makeup water in amount corresponding to the water discharged from the cooling tower.

4. In a process for removing carbon dioxide from a gas having a temperature above atmospheric by scrubbing said gas with water to absorb carbon dioxide, removing absorbed carbon dioxide from the water and recirculating the water into contact with further quantities of said gas, that improvement which comprises diverting a minor portion of the recirculating water and passing said portion in direct contact with the gas to cool it prior to scrubbing the gas with the remaining portion of the water, and discharging from the gas treating system the water used for cooling the gas thereby carrying heat out of the system in the discharged water in amount sufficient to maintain the water recirculated in the system at substantially atmospheric temperature.

DONALD A. ROGERS.